(No Model.)

E. WESTON.
TEMPERATURE REGULATING DEVICE FOR ELECTRICAL CIRCUITS.

No. 466,087.  Patented Dec. 29, 1891.

WITNESSES:
Gustave Dieterich.
M. Bosch.

INVENTOR
Edward Weston
BY
Park Benjamin
his ATTORNEY.

UNITED STATES PATENT OFFICE.

EDWARD WESTON, OF NEWARK, NEW JERSEY.

TEMPERATURE-REGULATING DEVICE FOR ELECTRICAL CIRCUITS.

SPECIFICATION forming part of Letters Patent No. 466,087, dated December 29, 1891.

Application filed June 4, 1891. Serial No. 395,134. (No model.)

*To all whom it may concern:*

Be it known that I, EDWARD WESTON, of Newark, Essex county, New Jersey, have invented a new and useful Improvement in Temperature-Regulating Devices for Electrical Circuits, of which the following is a specification.

My invention relates to a device for maintaining constant electrical resistance in a circuit despite changes in temperature occurring in said circuit. These changes are due to two causes—namely, first, the heating effect of the current in the circuit, and, second, thermometric variations in the surrounding atmosphere.

My invention compensates for both influences; and it consists in the combination, with an electrical circuit and arranged so as to be exposed to the atmosphere, and also in proximity to a conductor in said circuit, which conductor undergoes changes in temperature due to varying currents traversing it, of a body having the following physical property—namely, that when elevated in temperature it decreases in electrical resistance. If therefore an increase in resistance in one part of the circuit is produced by the causes above mentioned, a corresponding decrease in resistance occurs in the interposed body, and therefore the resistance of the whole circuit is maintained substantially constant.

Figure 1:
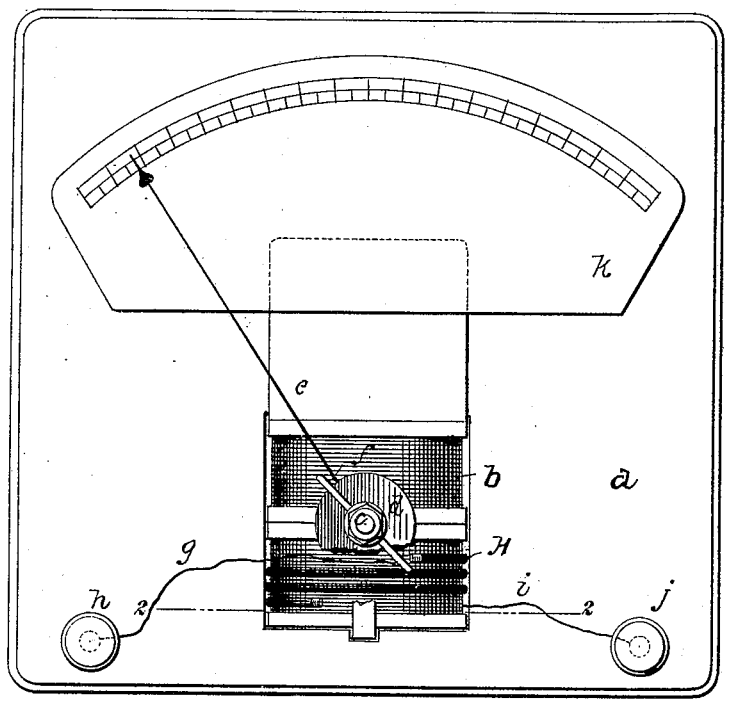
Figure 2:
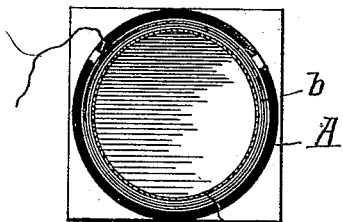
Figure 3:
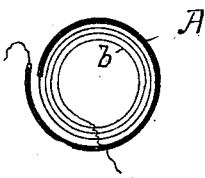

In the accompanying drawings, Figure 1 represents a plan view of an electrical measuring instrument to which my temperature-regulating device is applied. Fig. 2 is a sectional view on the line 2 2 of Fig. 1, and Fig. 3 illustrates in diagram a metallic coil with the inserted portion or section of carbon wire or filament.

Similar letters of reference indicate like parts.

In Letters Patent No. 433,637, granted to me August 5, 1890, and in other patents granted to me, I have fully described and claimed the instrument here shown, to which my present invention is applied. I will therefore set forth said instrument only briefly, referring to my aforesaid patent for the complete details of its construction and use.

$a$ is the base-board, which carries the fixed coil $b$ of insulated wire. Within this coil there is a pivoted coil, (not shown,) the pivot-shaft $c$ of which carries a disk $d$, which supports the index or pointer $e$. The bar $f$ is a tightening-bar for a spiral spring, (not shown,) which surrounds the coil-pivot. One end of said bar $f$ is connected to the circuit-wire $g$, which leads to the binding-post $h$. The circuit in the instrument proceeds from the binding-post $h$ to the bar $f$, to the coiled spring, to which said bar is connected, thence to the inner pivot-coil, (not shown,) thence to a second and similar coiled spring connected to the opposite end of the coil-pivot, then to the fixed coil $b$, and thence by wire $i$ to binding-post $j$.

$k$ is a scale-plate over which the index is moved. The coil $b$ and movable coil therein are electrically connected, and when a current traverses them the pivoted coil assumes a position dependent upon the difference of potential between the terminals of the instrument, and the index is thus moved over a suitably marked scale.

In instruments containing fine coils, especially of copper wire, the variation which the instrument circuit offers, due to changes in temperature, may be considerable. Thus, for example, the resistance of copper increases at the rate of about two-tenths of one per cent. for every degree Fahrenheit in temperature. Hence an elevation in temperature of but five degrees occurring in the coil will increase the resistance offered thereby to the current by one per cent., thus bringing a considerable source of error into the instrument. The changes in temperature are, as already stated, caused by the heating effect of the current in the conductor, and also by thermometric variations in the atmosphere. I compensate for both of these sources of disturbance in the following simple and efficacious manner: I interpose in the circuit of the fixed coil $b$ a body A of carbon or other material which possesses the property of offering a diminished electrical resistance on being increased in temperature. This body of carbon I proportion or arrange so that a thermometric variation which will produce a certain increase in resistance in the coils will produce a corresponding decrease of resistance in the carbon body, and in this way the resistance of the whole circuit is kept constant or substantially so. The carbon body A is preferably made in the form of a wire or filament, and it is to be arranged in close proximity to the coil *b* or other part of the instrument-circuit, so that it may receive heat by radiation or by radiation and conduction therefrom. In this way the carbon body is influenced by the action of the current. Said body is also to be placed so that the atmosphere may have free access to it, and in this way it is influenced also by thermometric variations in the atmosphere. A convenient way of arranging said body consists in interposing it directly in the coil-circuit, as here shown, the ends of the carbon wire being connected to the metallic wire of the coil by copper-deposition for example, and then winding said carbon wire around the exterior of the coil.

In another application for Letters Patent filed simultaneously herewith, Serial No. 395,135, I have described and claimed, broadly, the combination, with an electrical-measuring instrument and interposed in the circuit thereof, of an electrical conductor, the electrical resistance of which decreases with augmented temperature, and I therefore do not claim said invention in this specification.

I claim—

1. An electrical circuit composed of a conductor the electrical resistance of which increases with augmented temperature and a conductor the resistance of which decreases with augmented temperature, the said conductors being disposed in such proximity that heat received from the said first conductor may augment the temperature of said second conductor.

2. An electrical circuit composed of a conductor the electrical resistance of which increases with augmented temperature and a conductor the resistance of which decreases with augmented temperature, the said conductors being disposed in such proximity that heat received from the said first conductor may augment the temperature of said second conductor and being so proportioned and arranged to render the resistance of the whole circuit substantially constant despite the influence of temperature variations upon it.

3. In combination with an electrical measuring instrument interposed in the circuit thereof, and also placed in such proximity to the main portion of said circuit as to receive heat therefrom, an electrical conductor the resistance of which decreases with augmented temperature, the said conductor being proportioned and arranged with reference to said circuit to render the resistance in said circuit substantially constant despite changes of temperature therein due to both internal and external influences.

4. In combination with an electrical measuring instrument interposed in the circuit thereof, freely exposed to the atmosphere, and also placed in such proximity to the main portion of said circuit as to receive heat therefrom, an electrical conductor the resistance of which diminishes with augmented temperature, the said conductor being proportioned and arranged with reference to said circuit to render the resistance in said circuit substantially constant despite changes of temperature therein due to both external atmospheric variations and the internal heating effect of the current.

5. In an electrical measuring instrument, a coil one portion or section of which is composed of a conductor the resistance of which decreases with augmented temperature.

6. In an electrical measuring instrument, a coil one portion or section of which is composed of a conductor the resistance of which decreases with augmented temperature, the said portion being on the exterior of the coil.

7. In an electrical measuring instrument, a metallic coil having an inserted portion or section of carbon wire or filament.

EDWARD WESTON.

Witnesses:
M. BOSCH,
J. E. GREER.